United States Patent [19]
Chown et al.

[11] Patent Number: 5,439,588
[45] Date of Patent: Aug. 8, 1995

[54] COALESCING FILTER USING AN EXPANDABLE BED FIBER

[75] Inventors: Philip K. Chown, Addlestone; Simon Clarke, Staines; Eric C. Green, Whyteleafe; Anthony S. MacFarlane, Lightwater; Philip A. C. Medlicott, Pryford; Anna C. Lawrence, Hampton, all of England

[73] Assignee: Kalsep Limited, Berkshire, England

[21] Appl. No.: 219,858

[22] Filed: Mar. 29, 1994

Related U.S. Application Data

[60] Continuation of Ser. No. 922,255, Jul. 30, 1992, abandoned, which is a division of Ser. No. 752,196, Aug. 20, 1991, Pat. No. 5,174,907, which is a continuation of Ser. No. 399,408, Aug. 25, 1989, abandoned, which is a division of Ser. No. 880,825, Jul. 1, 1986, abandoned.

[30] Foreign Application Priority Data

Jul. 5, 1985 [GB] United Kingdom ............... 851714

[51] Int. Cl.6 ............................................. B01D 29/07
[52] U.S. Cl. .................... 210/350; 210/387; 210/458; 210/494.1; 210/497.1; 210/508; 210/DIG. 5
[58] Field of Search ............... 210/350, 387, 442, 451, 210/455, 458, 484, 485, 486, 487, 488, 489, 494.1, 494.3, 497.01, 497.1, 505, 508, DIG. 5

[56] References Cited

U.S. PATENT DOCUMENTS 1,872,430  8/1932  Ericson ........................... 210/494.3
3,648,846  3/1972  Sicard ............................. 210/494.1
4,299,699  11/1981  Boogay .
4,411,791  10/1983  Ward ............................. 210/DIG. 5

FOREIGN PATENT DOCUMENTS 915887  3/1982  U.S.S.R. .

Primary Examiner—Robert A. Dawson
Assistant Examiner—W. L. Walker
Attorney, Agent, or Firm—Morgan & Finnegan

[57] ABSTRACT

A filter coalescer cartridge for removing contaminants from a liquid comprises:
  (a) a first support at one end of the cartridge,
  (b) a second end support tending towards the other end of the cartridge,
  (c) a filter coalescer element comprising a plurality of aligned fibers or bundles of fibers, each fiber or bundle being secured at one end to one end support and at the other end to the other end support, and
  (d) a drive mechanism for relatively rotating and moving the end supports towards and away from each other to twist and compress and straighten and extend respectively the filter coalescer element.

The cartridge gives good performance and is easily regenerated.

10 Claims, 3 Drawing Sheets

COALESCING FILTER USING AN EXPANDABLE BED FIBER

This is a continuation of application Ser. No. 07/922,255, filed on Jul. 30, 1992, now abandoned, which is a division of Ser. No. 07/752,196, filed on Aug. 20, 1991, now U.S. Pat. No. 5,174,907, which is a continuation of Ser. No. 07/399,408 filed Aug. 25, 1989, now abandoned which is a division of Ser. No. 06/880,825, filed on Jul. 1, 1986, now abandoned.

This invention relates to apparatus for removing contaminants from a liquid. The contaminants may be solid particles and/or a second liquid immiscible with but finely dispersed in the first liquid.

It is often necessary to remove solid, semi-solid or oleaginous particles from liquid streams by filtration, for example from sea water prior to injection into an off-shore oil reservoir for pressure maintenance or secondary recovery.

In the production of crude oil from an oilfield it is usual for the oil initially produced to be substantially free from water. However, during the life of the oilfield the proportion of water produced with the crude oil often increases and substantial quantities can be generated. A point may be reached when it is desirable to separate the oil from the produced water before transporting the oil from the wellhead either by pipeline or tanker.

Oil refining, on the other hand, produces large quantities of oil contaminated aqueous effluent which must be treated to remove oil prior to disposal. Other sources of oil contaminated water which require treatment include terminals, depots and storage facilities.

In some cases, solid particles are present together with the contaminated liquid.

Enhanced gravity separation, using coalescence, is an established method of oil or water removal. Several devices for these duties are known, and coalescing cartridges having rigid elements have, in general, proved to be popular. These, however, suffer from certain disadvantages, The element, frequently a glass fibre element, acts both as a coalescing medium and as a filter. The filtration effect means that the cartridge eventually becomes blocked by the solids removed from the stream under treatment. It is sometimes possible to restore the activity of the cartridge, at least to some extent, by, back-washing. Sooner or later, however, this procedure ceases to be effective. When this happens, the cartridge element must be discarded. This is undesirable, partly because of the cost of the cartridges, but even more so on offshore platforms because of the supply, storage and disposal problems entailed.

Processes have been disclosed utilising fibres for either or both filtration and coalescence, but such filters operate with the fibres in linear or radial relationship to one another, which limits the opportunity for contact between the liquids passing through the filters and/or coalescers and the fibres.

Our copending European Patent Specification No 0 004 724B discloses a filter and/or coalester cartridge for removing contaminants from a liquid, which cartridge comprises a fixed first end support plate, a movable second end support plate movable relative to the first place and connected to an actuating rod, and a plurality of fibres or bundles of fibres, each fibre or bundle being secured at one end to the first end support plate and at its other end to the second end support plate characterised by the fact that the movable second end support plate is axially movable by the actuating rod towards and away from the fixed first end support plate to compress and extend the fibres respectively.

In use, the end plates are positioned close to one another by movement of the rod so that the fibres are compressed together to form a fine network in which the linearity of the fibres is lost. The fibres form of a network of irregular channels and apertures, which provide greater opportunities for contact than devices of the prior art and hence for coalescence.

We have now devised improved equipment in which the alignment of fibres during compression is controlled to provide a more compact filter coalester cartridge of improved performance.

Thus according to the present invention there is provided a filter coalescer cartridge for removing contaminants from a liquid which cartridge comprises:

(a) first end support at one end of the cartridge,
(b) second end support tending towards the other end of the cartridge,
(c) a filter coalescer element comprising a plurality of aligned yarns of fibres or bundles of fibres, each yarn or bundle being secured at one end to one and support and at the other end to the other end support,
(d) a drive mechanism for relatively rotating and moving the end supports towards and away from each other to twist and compress and straighten and extend respectively the filter coalescer element.

The cartridge preferably comprises (e) a permeable outer support for restraining the filter coalescer element in the compressed position and may also comprise (f) a permeable inner support for the filter coalescer element.

Components (a), (b), (c), (d), (e) and (f) are preferably coaxial cylinders.

The permeable outer and inner supports (e) and (f) are suitably perforated cylinders. The ratio of the diameter of the permeable outer support (e) to the permeable inner support (f) is in the range 1.1:1 to 5:1.

Normally there is an axial inlet to the cartridge and the liquid flows radially outwards through it.

The filter coalescer element (c) preferably has a length in the range 0.3 m to 2 m in the extended state. By length is meant the distance between the end supports which is occupied by fibre.

The compression ratio, i.e., the ratio of the extended length to the compressed length, is suitably in the range 1.2:1 to 3:1.

The filter coalescer element (c) preferably has a length to diameter ratio in the range 0.6:1 to 4:1 in the compressed state.

The amount of relative rotation is suitably in the range 90° to 270°.

The filter coalescer element is preferably in the form of a wrap around, semi-woven mat which is full woven at the edges attached to the end supports and cross threaded in between. The mat can be attached to the end supports by clamps or adhesives. Alternatively, the edges of the mat may be resin bonded to produce integral end supports. Other, methods of construction may also be used.

The diameter of the fibres is suitably in the range 1 to 50 micron.

Suitable materials for the fibres include wool, cotton, and viscose. The preferred materials are polyamides, polyesters and polyacrylates.

The cartridge is intended for use within a housing which will be fitted with appropriate drains, vents and level controlled offtakes.

One end support may be fixed and the drive mechanism may impart both rotational and longitudinal movement to the other. In this case the drive mechanism is suitably an actuating rod to which the appropriate motion can be imparted from outside the housing.

Alternatively, both end supports may be movable and the drive mechanism, or two mechanisms, if necessary, may impart rotational movement to one end support and longitudinal movement to the other. Again, a rod may be used to impart longitudinal movement.

According to another aspect of the present invention there is provided a method for removing particulate contaminants from a liquid which method comprises passing a liquid feedstock containing solid and/or liquid particles through a filter coalescer cartridge as hereinbefore described and removing a purified liquid.

If the particles are solid in origin then the cartridge acts as a filter. If the particles are liquid as in an emulsion, then the cartridge acts a a coalescer. If both solid and liquid particles are present, then the cartridge serves a dual purpose.

When used as a coalescer, a settling zone is preferably provided downstream of the cartridge to allow the coalesced droplets of the previously dispersed phase to settle out and form a continuous layer. This is not necessary when used as a filter only.

When the filter element is in its relaxed (partly extended) state the fibres hang loosely and can be readily forced apart. They are ineffective for filtration and/or coalescence in this state (but are suitable for regeneration, see later). If the two end supports are simply moved closer together the fibres compact and are suitable for filtration and/or coalescence. However some voids can remain within the fibre bundle which may impair performance.

When the fibres are twisted by relative rotation of the end supports but not altering the overall length of the element the fibres in the outer layers of the mat are placed under tension. They are compacted together towards the inner support as the individual strands attempt to take the shortest paths between the fixing points on the end supports.

When the fibres are twisted as above and the end supports are also brought closer together the tension on the fibres is relaxed. Further compression tends to force them outwards. This movement is controlled by containing the element within the outer support. As a result, the fibres form a more uniform, fine, evenly packed network which is less prone to overcompacted areas and void spaces. This gives an improved performance when compared with other configurations.

A cartridge according to the present invention is particularly suitable for dewatering crude oil and removing crude oil and petroleum products from tanker washings and refinery effluent. Normally such aqueous effluents contain from 5 to 750 mg of crude petroleum or petroleum products per kg of water. In general, the amount of suspended solids is very variable, however, typical effluents contain 5 to 500 ppm of suspended solids.

If solid material is present, this is trapped in the cartridge and does not interfere with the coalescence of the liquids.

By the altering the material of the fibre and the extent of rotation and compression within the cartridge, the degree of filtration can be regulated.

In the following discussion of the mechanism of coalescence, a dispersion of traces of oil in water is considered as a typical feedstock for treatment. However, the invention is also applicable to the coalescence of droplets of water dispersed in oil.

The flow rate of the contaminated water should be related to the fibre diameter in the element, the cross-sectional area of the element and the extent of compression of the fibres, so that some turbulence is created in the liquid as it flows through the element but not sufficient turbulence to prevent the deposition of a film of oil on the fibres nor to strip a deposited film off. This favours the movement of oil droplets across the stream lines in the winding passages in the network of the element so that they will collide with the oil film on the fibres and with each other.

Droplets colliding with the oil film trap oil which can be collected. Colliding with each other leads to growth in the size of droplets. If the water velocity is too great, however, the resulting increased turbulence strips the oil film from the fibres and breaks up oil droplets, thereby reversing the above effects.

Optimum flow rates can be chosen for given cartridge dimensions and fibre diameters in the filter element. In general, the hydraulic loading of liquid flowing through the cartridge should be in the range 5–150 m$^3$/m$^2$/h.

In use, as stated previously, the cartridge is operated with the fibres in the filter coalescer element crimped i.e. twisted and compressed. After an extended period of operation the element may become blocked or partially blocked with solids and/or liquid causing an unacceptably high pressure drop and reducing the efficiency of coalescence. The element is then easily regenerated by causing relative motion between the end supports to straighten and extend the fibres, and open up the network to a series of relatively wide channels. The contaminants are then removed by flushing with wash liquid to wash them off.

Cleaning can be effected using the forward flow of wash water or back-washing, depending upon application.

In stringent applications, it has been found that pulsed tensioning of the fibres during the wash cycle improves regeneration A cartridge according to the present invention compares favourably with conventional filter coalescer cartridges because of the ease of regeneration.

The invention is illustrated with reference to FIGS. 1, 2 and 3 of the accompanying drawings.

Figure 1:
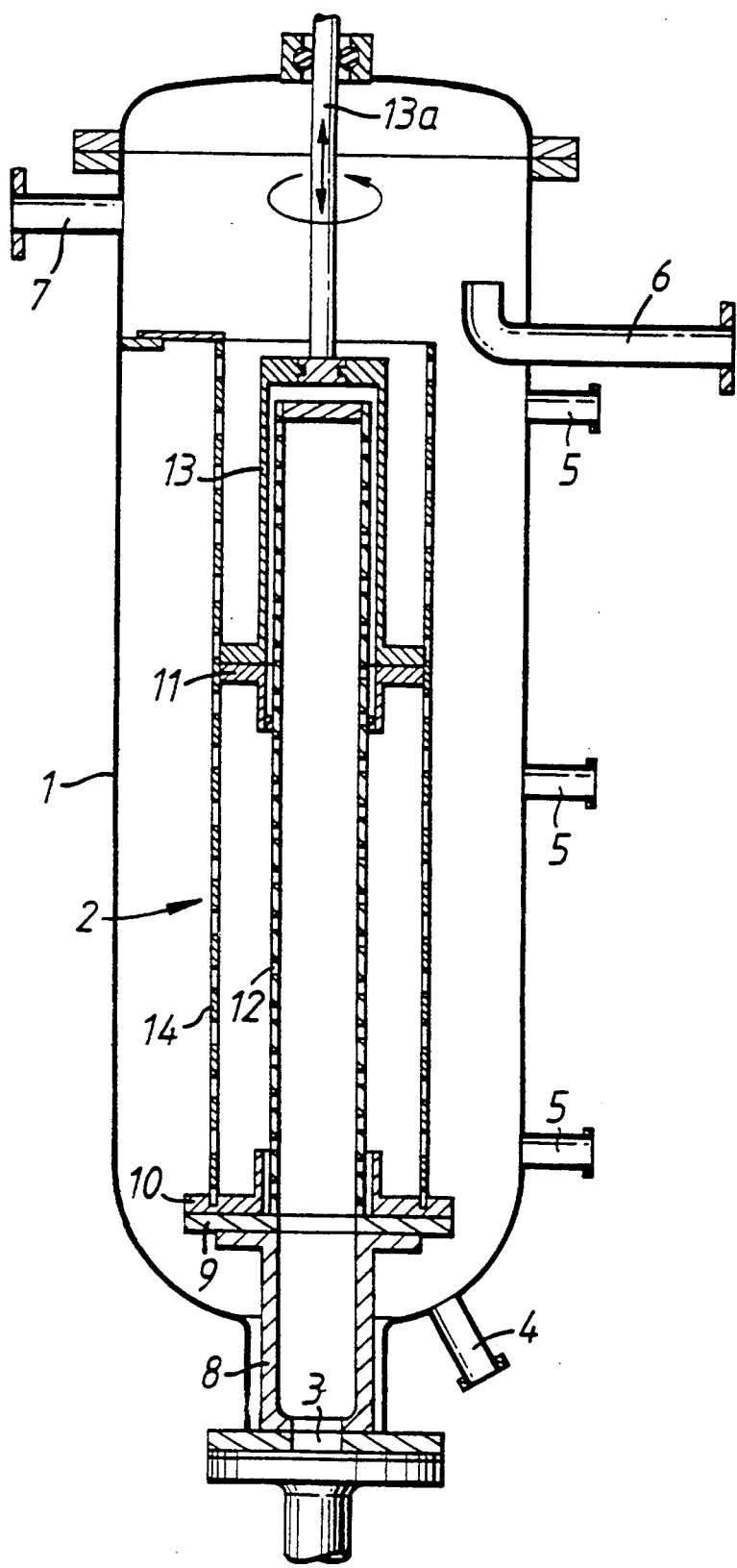
FIG. 1 is a section of a filter coalester incorporating a cartridge according to the present invention. In order to show the mechanical elements more clearly, the filter fibres are not shown in FIG. 1.

The filter coalester comprises a casing 1 enclosing a cartridge 2, The casing is fitted with an entrance 3, a drain or lower offtake 4, several level-controlled offtakes 5, an upper offtake 6 and a relief 7. A spigot 8 is fitted in the entrance 3 to locate and support the cartridge 2.

The cartridge comprises a fixed lower plate 9 attached to a fixed lower collar 10, the plate 9 resting on the spigot 8, and a movable upper collar 11 slidably mounted on a perforated inner cylinder 12 open at its lower end and closed at its upper end. The upper collar 11 is affixed to a "top hat" 13 which is connected to an actuating rod 13a to which rotational and longitudinal motion is imparted by a mechanism outside the filter coalester (not shown, possibly a hand wheel). Finally, the cartridge comprises a perforated outer cylinder 14 which provides a guide for the collar 11 and also restrains the fibres when compressed.

A filter coalester element 15 composed of polyacrylate fibres contains top and bottom woven edges 16 and 17 and only cross threads 18 in between. The element 15 is wound round the inner cylinder 14 and the upper edge 16 is clamped to the upper collar 11 and the lower edge 17 to the lower collar 10 by means of clamps (not shown).

Figure 3:
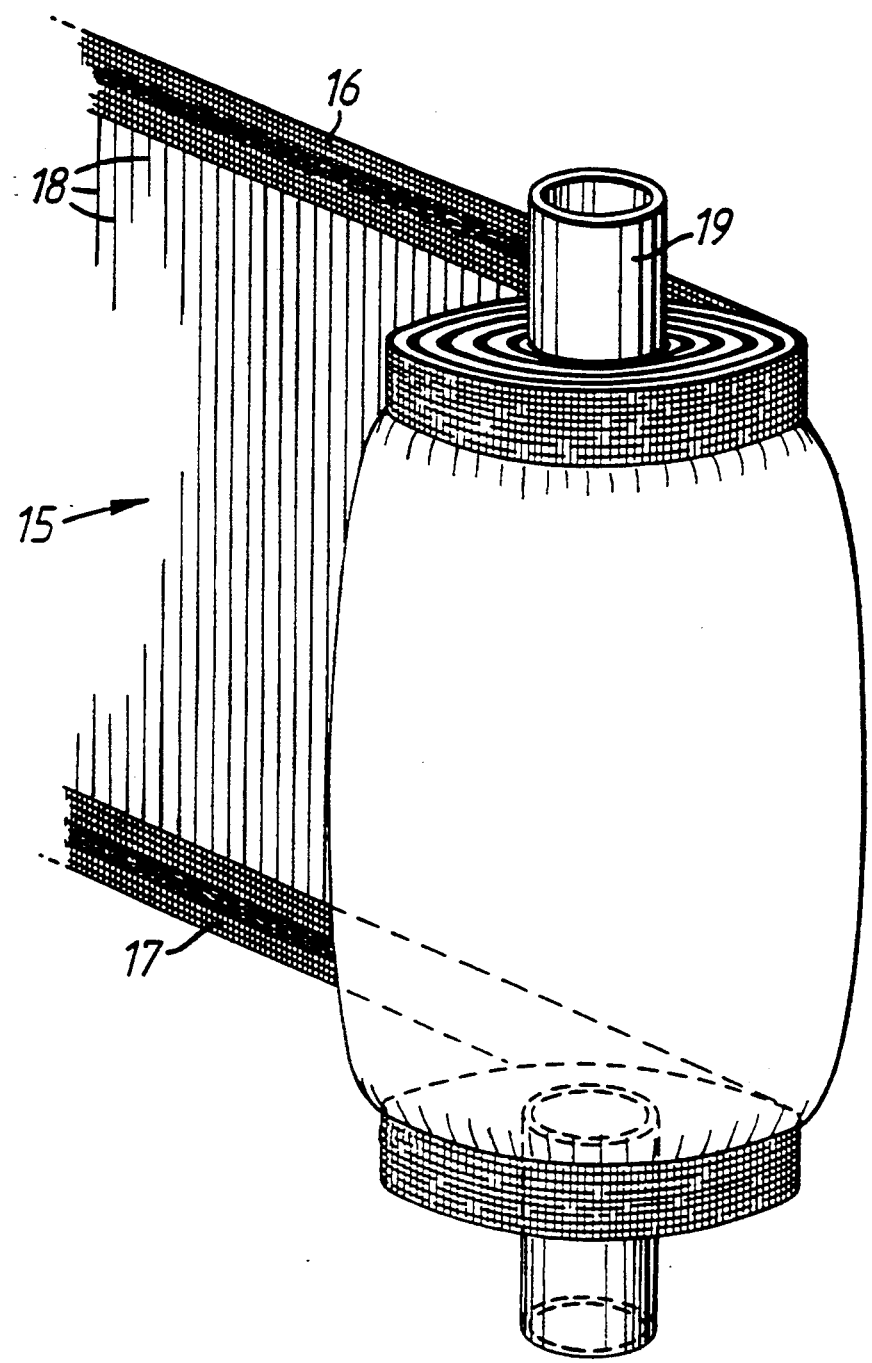
FIG. 3 is a drawing of an alternative cartridge assembly in which the end supports are integral with the filter element.

Alternatively, as in FIG. 3, the woven edges 16 and 17 may be coated with adhesive and then wound on to an element 19 held in a jig and rotated by a motor to form the cartridge 2. FIG. 1 shows the cartridge in its compact operating position in which the fibres would be twisted and compressed.

Feed enters the filter coalescer through the inlet 3 and passes into the interior of the inner cylinder 12. It then flows radially outwards through the perforations, through the filter coalescer element 15 and through the perforations of the outer cylinder 14 into the annulus between the outer cylinder 14 and the casing 1 to be withdrawn from selected outlet(s) 5.

In some cases it may be preferable, particularly for filtration, to use the opposite direction of flow to that specified above.

In order to regenerate the cartridge, the actuating rod 13a is actuated and the upper collar 11 is moved upwardly and away from the lower collar 10 and rotated so that the fibres 18 are straightened, separated and extended. The cartridge is then flushed with wash water.

The invention is further illustrated by means of the following Examples.

EXAMPLE 1

Figure 2:
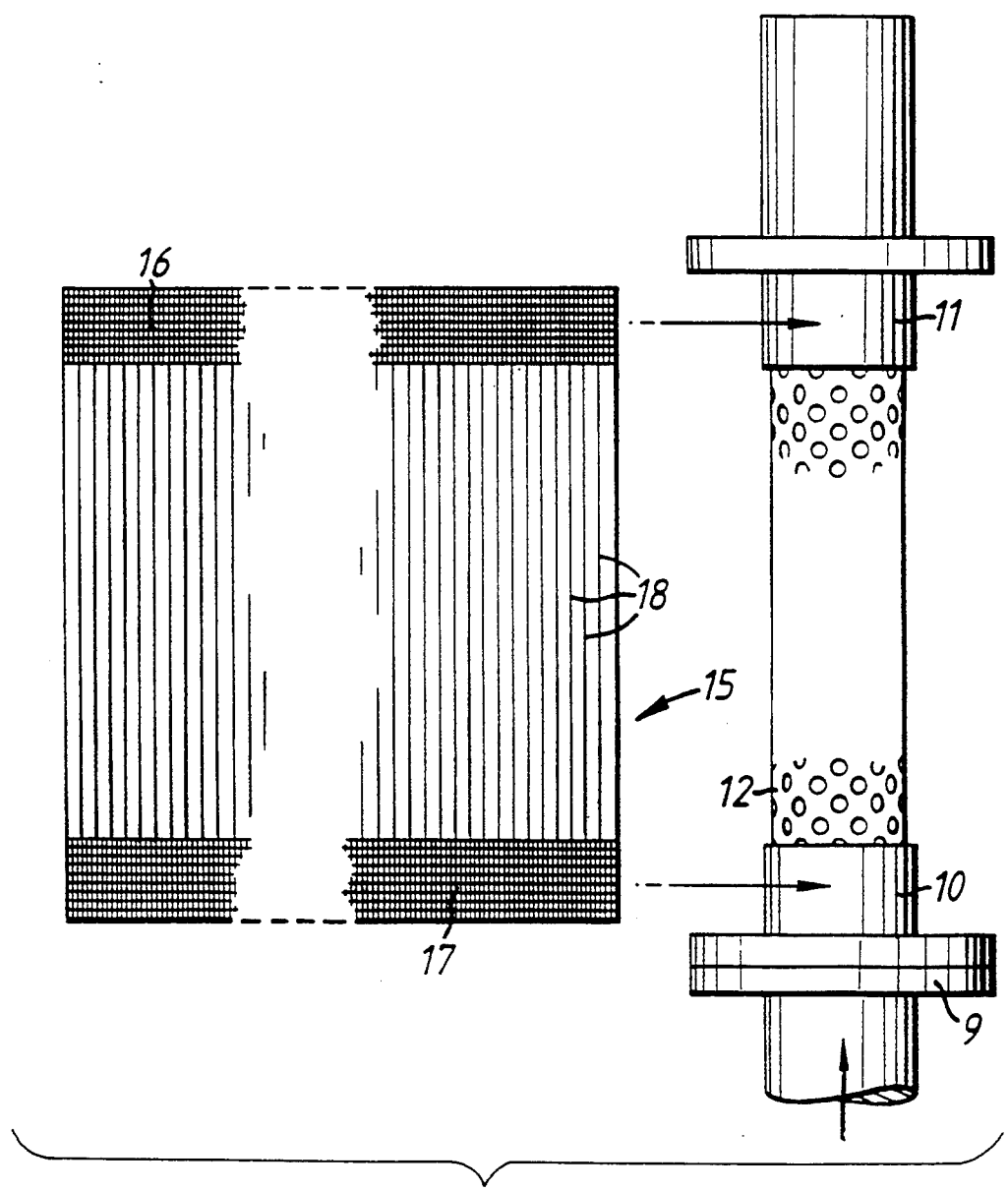
FIG. 2 is a schematic drawing showing the construction of the fibre mat.

The cartridge was of the type described with reference to FIGS. 1 and 2 of the drawings, with steel end collars.

The filter element contained 2,870 strands of Nylon 66, $20\mu$ in diameter and 21 cm in length. The diameter of the outer permeable cylinder was 12.5 cm and the inner 10.0 cm.

The feed was North Sea water containing a planktonic bloom. Over the duration of the test this varied in its particulate composition according to the following analysis.

|  | Typical no. of particles greater than size | | |
| --- | --- | --- | --- |
|  | 1 $\mu$m | 2 $\mu$m | 5 $\mu$m |
| Maximum No | 14510 | 2959 | 687 |
| Minimum No | 6020 | 122 | 52 |

The feed was passed through the cartridge of a flow rate of 12 l/min unless indicated otherwise. The bed length and extent of rotation was varied as shown in the following Table.

The following results were obtained.

TABLE 1

| Hrs on stream | Bed length cm | Rotation degrees | ΔP mbar | Removal Efficiency | | |
| --- | --- | --- | --- | --- | --- | --- |
|  |  |  |  | >1 um % | >2 um % | >5 um % |
| 0 | 8.7 | 225 | 69 |  |  |  |
| 0.75 |  |  | 138 | 61.5 | 86.9 | 97.7 |
| 1 |  |  | 242 | 66.6 | 84.4 | 89 |
| 2 |  |  | 276 | 72.2 | 85.1 | 91.1 |
| Filter wash | | | | | | |
| 4 | 10.8 | 225 | 35 | 69.1 | 89.5 | 95 |
| 5 |  |  | 104 | 75.2 | 91.3 | 95.7 |
| 6 |  |  | 138 | 79.4 | 91.5 | 95.7 |
| 7 |  |  | 207 | 74.6 | 87.3 | 93.7 |
| 8 |  |  | 276 | 76.3 | 88.4 | 96.5 |
| Shut down and drain Filter wash | | | | | | |
| 9 | 12.1 | 225 | 69 | 68.2 | 84.2 | 93.8 |
| 10 |  |  | 69 | 72.8 | 87.8 | 95.7 |
| 11* |  |  | 69 | 83.6 | 94.4 | 98.1 |
| 12* |  |  | 104 | 87.8 | 97.0 | 99.1 |
| 13* |  |  | 104 | 86.9 | 95.5 | 98.4 |
| 14* |  |  | 138 | 87.6 | 94.0 | 96.1 |
| Shut down and drain | | | | | | |
| 15 | 12.1 | 225 | 35 | 78.5 | 92.4 | 94.1 |
| 16 |  |  | 35 | 84.7 | 93.0 | 97.3 |
| 17 |  |  | 69 | 86.9 | 95.3 | 98.9 |
| Filter wash reverse flow | | | | | | |
| 19 | 10.1 | 180 | 898 | 89.2 | 93.6 | 96.8 |
| 20 |  |  | 828 | 89.2 | 94.9 | 98.7 |
| 21 |  |  | 897 | 90.9 | 95.3 | 95.8 |
| 22 |  |  | 966 | 91.8 | 96.6 | 98.6 |
| 23 |  |  | 1932 | 82.2 | 85.6 | 88.9 |
| 24 |  |  | 1932 | 82.9 | 87.1 | 90.8 |
| Filter wash | | | | | | |
| 25 | 10.1 | 180 | 690 | 89.3 | 95.2 | 96.7 |
| 25.5 |  |  | 725 | 93.7 | 97.5 | 97.2 |
| 27 |  |  | 828 | 95.7 | 98.2 | 99.5 |
| 28 |  |  | 1070 | 95.4 | 97.3 | 96.5 |
| 28.5 |  |  | 1518 | 93.7 | 96.1 | 97.2 |
| 30 |  |  | 2070 | 93.1 | 96.5 | 96.8 |
| Filter wash | | | | | | |
| 31 | 10.5 | 180 | 552 | 85.5 | 92.0 | 92.7 |
| 31.5 |  |  | 621 | 87.5 | 95.0 | 96.6 |
| Shut down and drain | | | | | | |
| 32 | 10.5 | 180 | 966 | 89.6 | 96.3 | 100 |
| 33 |  |  | 1173 | 93.3 | 97.0 | 98.6 |
| 34 |  |  | 1794 | 91.3 | 94.8 | 96.7 |

*Flow rate 6 l/min

The results show that the cartridge is an effective filter over a range of operating conditions. It should be noted that a short induction period is required after each change, after which the performance improves.

The higher pressure drops after 17 HOS were caused by a more contaminated feedstock.

EXAMPLE 2

A Similar cartridge was used to remove water from wet crude oil by coalescence.

In this case the relaxed length of the filter element was 25 cm and it was used simultaneously compressed to a length of 19.0 cm and twisted through 180°.

The crude oil was derived from the Egnauton oilfield, Nottingham. A demulsifier sold under the Trade Name Petrolite DS 964 was added in a concentration of 10 ppm to aid coalescence.

The following results were obtained.

TABLE 2

| Temperature °C. | 50 | 51 | 52 | 56 |
| --- | --- | --- | --- | --- |
| Water in Feed % | 17.7 | 16.0 | 11.2 | 14.3 |
| Water in Product % | 1.4 | 0.9 | 2.0 | 0.5 |
| Element ΔP m bar | 41 | 0.5 | 0.9 | 0.3 |
| Total Flow m³/hr | 2.4 | 1.9 | 2.5 | 1.3 |
| Fluid Load m³/m²/hr | 31.3 | 24 | 32.8 | 16.9 |

These results show that the cartridge is an effective coalescer.

We claim:

1. A filter coalescer cartridge for removing contaminants from a liquid which cartridge comprises:
   (a) a first support at one end of the cartridge;
   (b) a second end support at the other end of the cartridge said end support being moveable relative to each other both rotationally and longitudinally, and
   (c) a filter coalescer element in a compressed position or state comprising a first, second and third zone, the second zone being between said first and third zones and being made of a plurality of fibrous yarns, each yarn made up of a number of crimped fibres, the first and third zones being sealed strips secured to the first and second end supports, and
   (d) a drive mechanism connected to one of the end supports.

2. A filter coalescer cartridge according to claim 1 further comprising
   (e) a permeable outer support for restraining the filter coalescer element in the compressed position.

3. A filter coalescer cartridge according to claim 2, further comprising
   (f) a permeable inner support for the filter coalescer element.

4. A filter coalescer cartridge according to claim 3 wherein the components (a), (b), (c), (d), (e) and (f) are coaxial cylinders.

5. A filter coalescer cartridge according to claim 4 wherein the ratio of the diameter of the permeable outer support (e) to the permeable inner support (f) is in the range 1.1:1 to 5:1.

6. A filter coalescer cartridge according to claim 1 wherein the first and third zones of the coalescer element are sealed by an adhesive.

7. A filter coalescer cartridge according to claim 1 wherein the compression ratio of the filter coalescer element (c) is in the range 1.2:1 to 3:1.

8. A filter coalescer cartridge according to claim 1 wherein the filter coalescer element (c) in the compressed state has a length to diameter ratio in the range 0.6:1 to 4:1.

9. A filter coalescer cartridge according to claim 1 wherein the filter element (c) is in the form of a wrap around, semi-woven mat which is full woven at the edges attached to the end supports (a) and (b) and cross-threaded in between.

10. A filter coalescer cartridge accordion to claim 1 wherein the fibres of the filter coalescer element (c) are made from polyamide, polyester or polyacrylate material.

* * * * *